United States Patent [19]

Lisimaque et al.

[11] Patent Number: 5,014,312
[45] Date of Patent: May 7, 1991

[54] SECURITY SYSTEM FOR THE PROTECTION OF PROGRAMMING ZONES OF A CHIP CARD

[75] Inventors: Gilles Lisimaque, Peynier; Yvon Bahout, Fuveau, both of France

[73] Assignee: SGS-Thomson Microelectronics SA, Gentilly, France

[21] Appl. No.: 297,079

[22] Filed: Jan. 13, 1989

[30] Foreign Application Priority Data

Jan. 20, 1988 [FR] France ................. 88 00594

[51] Int. Cl.⁵ .................. H04L 9/00; G06F 15/20; G06F 7/04
[52] U.S. Cl. ........................ 380/25; 380/21; 380/23; 235/375; 340/825.31; 364/900; 364/953.3
[58] Field of Search ............ 380/4, 16, 21, 23-25, 380/50; 235/375, 379, 380, 382, 382.5, 492; 902/26; 340/825.31; 364/953.3 MS

[56] References Cited

U.S. PATENT DOCUMENTS

| 3,934,122 | 1/1976 | Riccitelli | 235/492 X |
| 4,105,156 | 8/1978 | Dethloff | 235/441 |
| 4,268,911 | 5/1981 | Bell | 365/104 |
| 4,453,074 | 6/1984 | Weinstein | 235/380 |
| 4,613,937 | 9/1986 | Batty | 364/413.27 |
| 4,650,975 | 3/1987 | Kitchener | 235/375 |
| 4,683,553 | 7/1987 | Mollier | 380/4 |
| 4,777,355 | 10/1988 | Takahira | 235/492 X |
| 4,827,512 | 5/1989 | Hirokawa et al. | 380/23 |
| 4,855,578 | 8/1989 | Hirokawa et al. | 235/382 X |

FOREIGN PATENT DOCUMENTS 0089876 9/1983 European Pat. Off. .
0218176 4/1987 European Pat. Off. .
87/05420 9/1987 PCT Int'l Appl. .

OTHER PUBLICATIONS

Onde Eletrique—vol. 64, No. 1, Jan.-Feb. 1984, pp. 18-23.

Primary Examiner—Linda J. Wallace
Attorney, Agent, or Firm—Roland Plottel

[57] ABSTRACT

The use of chip cards, with the level of security of the type associated with chip cards of the type used by banks, is extended to move widespread use by organizing a secure dispatch of blank chip cards to customers wishing to program specific applications therein. The system consists in sending this customer the blank chip card itself and a programming access key to this card, by separate routes. To prevent any additional risks, the access key is itself enciphered and can be deciphered only be a deciphering element in the possession of the customer. The card can then be programmed only if this card is confronted with its deciphering key.

6 Claims, 2 Drawing Sheets

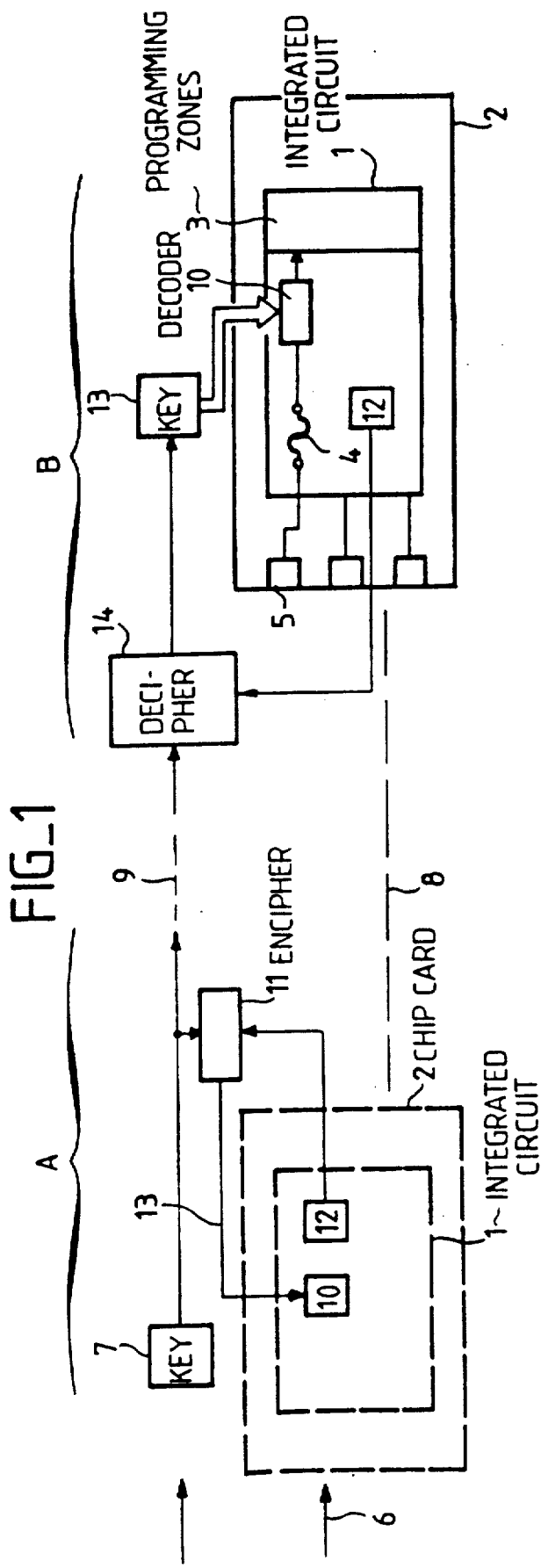
FIG_1
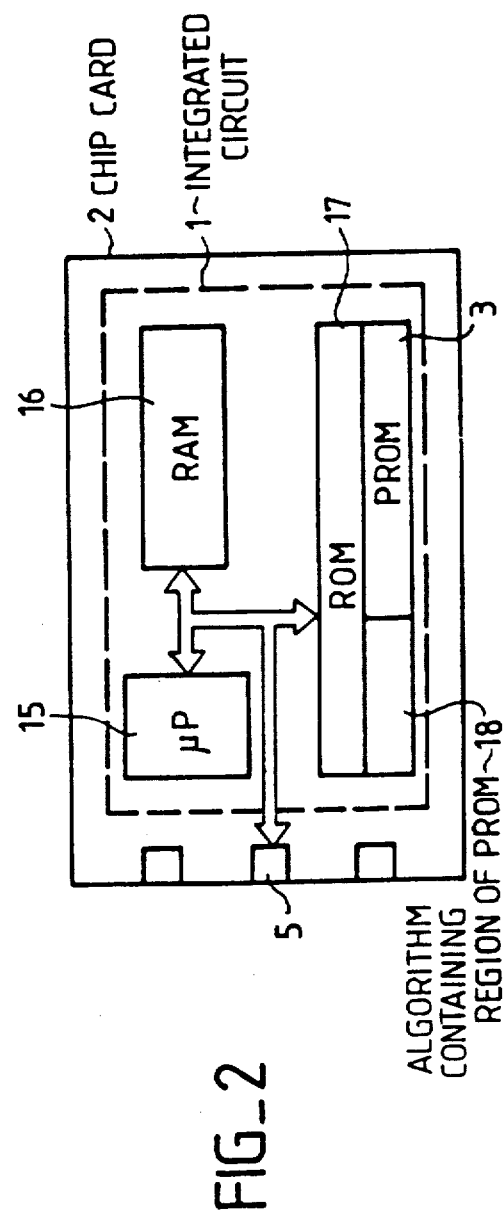
FIG_2

FIG_3
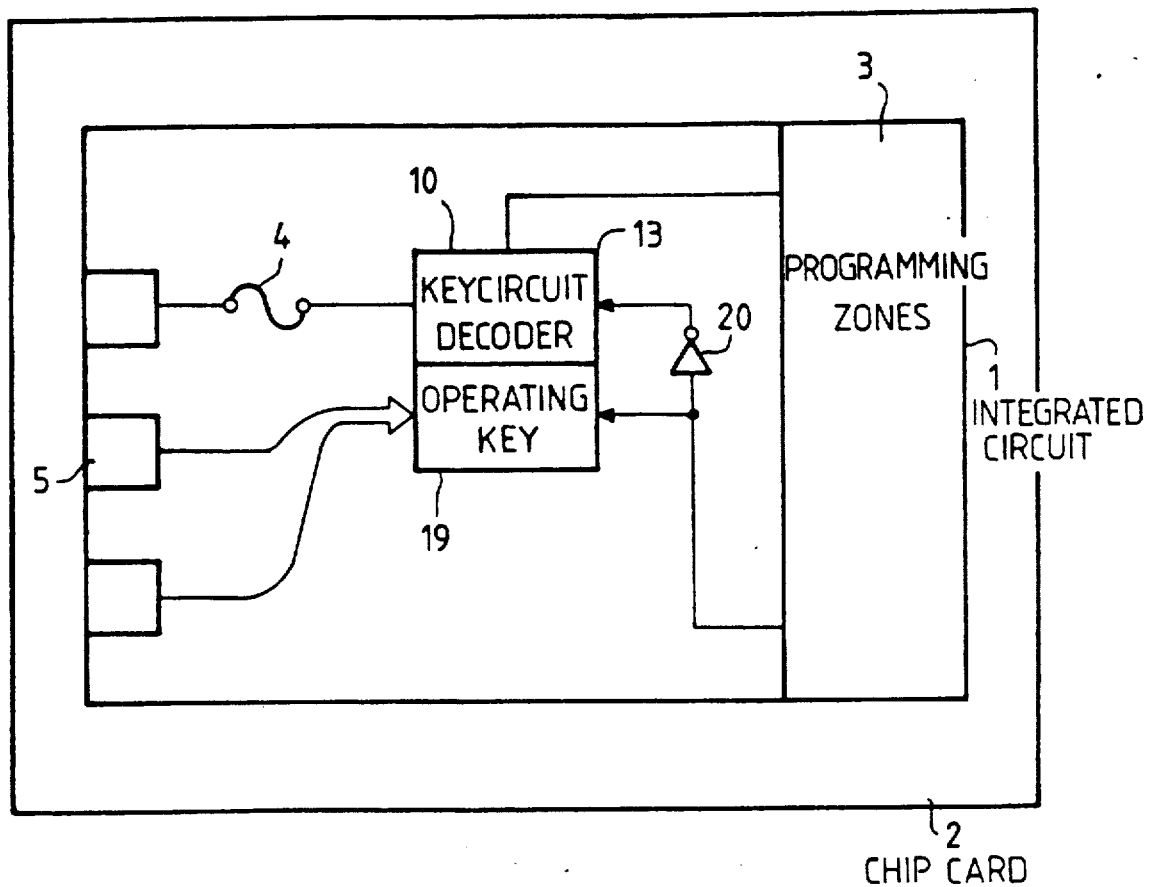

SECURITY SYSTEM FOR THE PROTECTION OF PROGRAMMING ZONES OF A CHIP CARD

BACKGROUND OF THE INVENTION

1. Field of the Invention

An object of the present invention is a security system to protect protection zones of a chip card. The chip cards in question are memory cards in which the storage element is an electronic, integrated circuit known as a chip. Cards of this type are used in the banking sector. They act as means of payment and can be used both to manage an account, by indicating the balance recorded therein and by accounting for the various flows to which it is subjected, and to safeguard its use by the introduction of a secret code. Owing to their purpose, cards of this type are placed in an environment where the chief danger to be avoided resides in faulty security. A great many systems have been perfected for this purpose. It is an object of the present invention to make it possible to place chip cards with different functions at the disposal of sectors of industry other than the banking sector, while ensuring that these cards possess the same level of security in certain programming zones.

2. Description of the Prior Art

Chip card applications in the banking sector are well known. In brief, in the handling of current expenses, they consist in debiting and crediting operations with respect to the account managed in the card, possibly in authorizing a certain line of credit to certain customers. In addition, they enable safe use, through the recognition of a secret code, known to the bearer of the card. So as to introduce no risk into the distribution of memory cards, the banking sector has chosen a simple practice for the manufacture of these cards. Manufacturers of electronic equipment are entrusted, by contract, with several tasks. Their first task is to manufacture the integrated circuits, and the cards which contain them. A second task is to directly program the manufactured, integrated circuits (which, besides, have a universal character) to make them suitable for use in banking applications which are now well known and which, in the final analysis, are quite simple.

At this stage in the manufacture of the cards, the manufacturers further have the task of encoding the secret code that provides access to the card and of sending this secret access code to the future bearer of the card (i.e. to the bank's customer), while the card itself is sent to the bank. When the future bearer of the card receives his secret access code, namely his operating code, he is informed, at the same time, that he must go and get his card from the bank. Thus the end result obtained is that, in no case, do the card and the secret access code travel physically, in a detectable way, at the same time and by one and the same means of transport. This method of dispatch is now entirely satisfactory, and provides sound resistance to attempts at theft or fraud.

In practice, there is no existing means of finding the secret access code, namely the card operating code, through the customer's account number which is indicated on it. Besides, the loss of the secret access code number makes it necessary to destroy the card: it becomes unusable. Moreover, it is then possible for the manufacturer to undertake all kinds of procedures, notably of a technological type, to prevent the contents of the card from being pirated. Banking cards are, in fact, technologically inviolable.

It is necessary to create a similar environment of security in applications other than those of the banking sector. For example, a bearer of a card should be able to gain access to strategic defense-related places and, in these places, he should be authorized to perform a certain number of operations with this card. The essential difference between these operations and banking operations is that the former are not known, in principle, to the card manufacturer. He, therefore, cannot program them. The card manufacturer therefore has to export technical means, to perform certain manufacturing operations, to his customer who manages these cards. These manufacturing operations conclude programming operations performed by this customer, and ensure the desired security. To put it simply, it can be said that these operations may consist of a logic lock which, after it is shut, prevents certain zones of the card from being programmed, or certain programmed zones of this card from being read. However, this method cannot be envisaged when the customer does not intend to manufacture and use a very large number of cards. The customer cannot invest sufficient means in an application of limited use. In the alternative method, it is easy to understand the reluctance of a customer of this type, all the more so if he represents a country's defense set-up, to give an integrated circuit manufacturer an explanation of the operating algorithms which are to be introduced into the cards and which he wishes to keep secret.

The manufacturers' problem, therefore, is to place, at the disposal of these customers, who are concerned with specific applications, chip cards possessing a system of technological security and operating security of a level equivalent to that currently used in the banking system, and to do so in such a way that the manufacturing costs do not become prohibitive (with the export of the manufacturer's manufacturing means to the customer), and without the customer's being obliged to reveal the specific programming application that he intends to program in his cards. A simple solution would lie in sending chip cards of this type to this customer, with the secret access code, for subsequent operation, so that he programs them in his specific application. At the end of this programming operation, he could make a logic lock flip over, thus irrevocably preventing any access to the programmed zones of this chip card (so that no fraudulent person or thief could in any way attempt to reconstitute secret algorithms recorded therein).

The drawback of this method is that, under these conditions, the cards travel without any security. And for good reason, since the purpose of the security system is to prevent their subsequent programming, whereas this programming has not yet taken place and whereas it is precisely in order to be programmed that these cards are travelling. The situation faced then is one where systems with highly powerful functions travel by standard means of transportation (for example, through the postal system or by train). The systems may be intercepted, before reaching their consignees, by ill-intentioned persons who might be tempted to program them in their own way, with a view to counterfeiting an application of which, as it happens, they have knowledge and to which they do not normally have access.

An object of the invention is to overcome these drawbacks by proposing a security system to protect the programming zones of a chip card wherein, by its principle, a programming key is prepared when the card is manufactured. In practice, this key is a logic key: it is represented by a sequence of decimal, binary or other logic states. This logic key is conveyed to the customer by channels different from those used to convey the chip card itself. In other words, the interception of the card alone is not enough to enable misappropriation of its use. Without the programming key, this card is unusable. By contrast, upon receiving the card and the key, the normal customer himself can gain access to the programming zones of this card by introducing the logic key into the card. When this programming is over, he can ask the card (i.e. cause a programme, prerecorded for this purpose, to be executed in the card) to produce its own operating key (which is, of course, different in its essence from the programming key). Once this operating key is known, this customer can lock in the programming of the card in making an irreversible technological lock flip over. All this customer has to do then is to distribute his cards in the same way as the chip card manufacturer does in banking applications.

In one improvement, the programming key is enciphered. This means that the key which travels cannot be directly used to validate the operations for programming the card. The programming key has to be first deciphered before it is applied to the card. In this improvement, the manufacturer has an enciphering machine while the customer has a deciphering machine. Thus a situation is prevented where resourceful thief, who might manage to procure both the programming key and the card, would be able, despite everything, to perform dishonest operations with his card.

In another improvement, the programming key function in the card comprises a one-time reading function. This function is designed to recognize the right key only once. If a wrong key is recognized, or if a second programming operation is attempted after the first one has been performed, and after the power supply of this card has been cut off, this programming function will have flipped over and will have become inaccessible.

SUMMARY OF THE INVENTION

The invention therefore concerns a security system to protect programming zones of a chip card, said system comprising a logic lock which is open before the programming of these programming zones, and which can be shut after this programming, said system comprising a programming key and, in the card, a programming access key function to enable the programming of these zones of the card.

BRIEF DESCRIPTION OF THE DRAWINGS

The invention will be better understood from the following description and from the accompanying figures. These figures are given purely by way of indication and in no way restrict the scope of the invention. Of these figures:

FIG. 1 shows a schematic block diagram of a security system according to the invention;

FIG. 2 shows a chip card provided with memory zones to be protected;

FIG. 3 shows an example of a circuit for the validation of the programming key.

DESCRIPTION OF A PREFERRED EMBODIMENT

FIG. 1 shows a security system according to the invention. In this system, a manufacturer of electronic integrated circuits performs operations A on integrated circuits 1 contained in chip cards 2, while programming operations B are performed by the customer on programming zones 3 of the integrated circuit 1 of the chip card 2. In this system, the integrated circuits possess a logic lock 4 which is open before the programming of the programming zones 3. For example, to simplify the matter, the open logic lock may be formed by a fuse which sets up an electrical link between metallizations 5, providing access to the card 1, and connections providing access to the card 1 and connections providing access to the programming zones 3. When the lock is open, when the fuse is in good condition, the electrical signals can pass through. When the lock is shut, when the fuse has blown, the electrical signals can no longer pass through, ensuring the permanent protection of the zones 3 concerned. The presentation of the logic lock in the form of a fuse 4 is symbolic. The logic lock may, depending on known forms, be replaced by a decision matrix which receives the electrical signals to be transmitted at input and provides for the transmission of these signals only if their nature conforms to a complicated design for decision-making. The presence of logic locks of this type is known, and the shutting of these locks, namely the blowing of the fuse or the validation of the decision matrix, does not directly form part of the invention. For, before the programming of the memory zones 3, the functions of the integrated circuit 2 should be as universal as possible. This means that the customer should be able to program whatever he wishes therein.

At the moment (symbolized by the arrow 6) of manufacture of the card 2, provided with its integrated circuit 1, the manufacturer concurrently prepares a programming key 7, namely the programming key of the invention, to enable the zones of the card to be programmed. While the card is sent to the customer by a route 8, the programming key, for its part, is sent to him by a different route 9. When he receives the programming key 7, the customer introduces it into the integrated circuit 1 according to a simple protocol. This introduction may take the form of an injection of electrical signals, corresponding to this key, in series into this card through a metallization 5 providing access to the integrated circuit 1. This integrated circuit 1 then has a circuit 10 for decoding the key, forming, so to speak, a programming access key function. This decoding circuit 10 then authorizes the transmission of the programming electrical signals to the memory 3. The circuit 10 may be such that its electrical deactivation, for example through a break in the supply current to the memory card, causes it to flip over irreversibly into a state where it is no longer capable of accepting the programming key 7. However, before cutting this supply off, the customer (namely the user) has all the time available to program the instructions that interest him in the programming zone 3 of the integrated circuit 2.

In order to render a situation, where a thief acquires the key 7 simultaneously with the corresponding chip card 2, inoperative, the key 7 is not conveyed, as it is, on its route 9. Preferably, it is rather enciphered by an enciphering machine 11. The machine 11 receives, firstly, the key 7 and, secondly, a manufacturing number 12 identifying the card 2. The machine 11 produces an enciphered key 13. The enciphered key 13 produced is then introduced into the decoding circuit 10. The key 7 then no longer serves any purpose if it is intercepted as such. Upon its arrival, the key 7 is introduced jointly with the manufacturing number 12 into a deciphering machine 14 which also reproduces the true key 13 (in the form of a logic state sequence). It is then enough, at the programming instant, to make the reproduced key 13 correspond to the right card 2, identified by its manufacturing number 12.

The enciphering machine and the deciphering machine 14 are of a known type. They are transcoders. They are kept on a resident basis, at least for a certain period of time, at the manufacturer A's place, on the one hand, and at the customer B's place on the other hand. Nonetheless, they can be modified regularly, of course complementarily with respect to each other. Under these conditions, there is no risk if the key 7 falls into the hands of a thief: he could do nothing with it.

FIG. 2 shows a chip card 2 provided with its integrated circuit 1. In an application of a universal nature, this integrated circuit has a microprocessor 15 in relation with a processing memory 16, a read-only memory 17 and a programmable memory 3. In the banking applications envisaged, the read-only memory 17 is fixed to such an extent that it authorizes only the placing of data in the programmable memory 3. This amounts to giving up a great part of the functional possibilities of an integrated circuit of this type. In the applications permitted by the invention, with the level of security obtained, the functions of the card can be determined at will by the customer who programs it accordingly. The read-only memory can then be reprogrammed with commands that are more ambitious than commands that permit only a restricted range of functions for a banking application. Depending on the nature of the lock 4, which would then be no longer a symbolic lock but a decision matrix, it would then be possible to place all or a part of the programming memory zone 3 at the disposal of the bearer of the card. For example, it would be possible to prohibit the reading or outward transmission of secret codes or processing algorithms contained in a region 18 of the programming zone 3. This restriction on use is, however, of a known type and does not directly form part of the invention.

FIG. 3 shows a schematic view of a circuit for the validation of the programming key 13 which can be activated only once. When the operations for programming the programming zone 3 have been performed, the customer can replace the programming access key (written at the manufacturing stage) by a operating key 19 for the card 2. This operating key may even be prepared by an algorithm, which is introduced into the region 18 of the programming zone 3 and to which access may then be prohibited by an adequate decision matrix. A controlled logic inverter 20 (which may or may not be coupled with the flipping over of the lock 4) is used to validate the step for putting one of the two keys into operation in the circuit 10. This inverter may have a permanently irreversible inversion feature. Furthermore, the circuit 10, which decodes the keys, may be such that only one wrong presentation of the programming key or of the operation key would imply its permanent deactivation and hence, the invalidation of the programming or operation of the card. This deactivation could be set off by an ouput of a comparator which memorizes a wrong presentation.

What is claimed is:

1. A security system to protect zones of a chip card, said system comprising in the card, a logic lock which is open before programming of said zone and which can be shut after programming, said system further comprising:
   first and second means for producing, respectively, a first and second enciphered key from a programming key,
   means for introducing in said card said first enciphered key,
   in said card, an access circuit for enabling the programming of said zones, said circuit being responsive to application to the card of said second enciphered key only if it corresponds to said first enciphered key present in the card.

2. A system according to claim 1, wherein said first and second means use as an enciphering parameter a manufacturing number of the card.

3. A system according to claim 1 or 2, wherein the logic lock is irreversible.

4. A system according to claim 1 or 2, wherein the chip card may perform several functions and wherein said logic lock is a decision matrix capable of prohibiting execution of certain functions.

5. A system according to claim 1 or 2, wherein the access circuit comprises means to authorize only one reading of the enciphered key present in the card.

6. A system according to claim 1 or 2, comprising means for permanently disabling said access circuit when an incorrect enciphered key is applied to the card by said second enciphering means.

* * * * *